Dec. 9, 1958 H. M. HERBENER 2,863,484

FOLDER AND POCKET CONSTRUCTIONS

Filed Jan. 19, 1956 6 Sheets-Sheet 1

INVENTOR.
HENRY M. HERBENER
BY B.P. Fishburne
ATTORNEY

INVENTOR.
HENRY M. HERBENER
BY
ATTORNEY

Dec. 9, 1958 H. M. HERBENER 2,863,484

FOLDER AND POCKET CONSTRUCTIONS

Filed Jan. 19, 1956 6 Sheets-Sheet 3

INVENTOR.
HENRY M. HERBENER

BY [signature]

ATTORNEY

FOLDER AND POCKET CONSTRUCTIONS

Filed Jan. 19, 1956

INVENTOR.
HENRY M. HERBENER
BY B [signature]
ATTORNEY

FOLDER AND POCKET CONSTRUCTIONS

Filed Jan. 19, 1956 6 Sheets-Sheet 5

INVENTOR.
HENRY M. HERBENER
BY [signature]
ATTORNEY

*INVENTOR.*
HENRY M HERBENER
*BY* B P J [signature]
*ATTORNEY*

United States Patent Office 2,863,484
Patented Dec. 9, 1958

2,863,484

FOLDER AND POCKET CONSTRUCTIONS

Henry M. Herbener, Thomasville, Ga.

Application January 19, 1956, Serial No. 560,235
15 Claims. (Cl. 150—35)

My invention relates to folders for bills or the like and to pocket constructions.

An important object of the invention is to provide a bill folder which may be made of flexible plastic material and the several parts of which may be assembled and secured together in a highly economical and efficient manner.

A further object of the invention is to provide a bill folder which will have the maximum holding capacity with the minimum material used in construction.

A further object of the invention is to provide a bill folder which is extremely thin, free from bulges and hence neat and attractive in appearance.

A further object of the invention is to provide a simplified pocket construction to be secured to the partition and foldable over the same.

A further object of the invention is to provide means to stiffen or reinforce the coin receiving cup to render its flexing or bowing easy and convenient.

A further object of the invention is to provide a plastic folder which may be constructed by using high frequency current and pressure for sealing or welding the parts together by use of die means shown in Patent 2,631,646.

Other objects and advantages of the invention will be apparent during the course of the following description.

Figure 2:
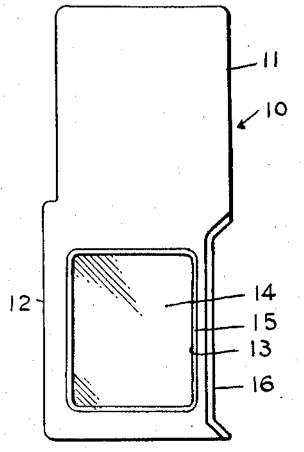
Figure 3:
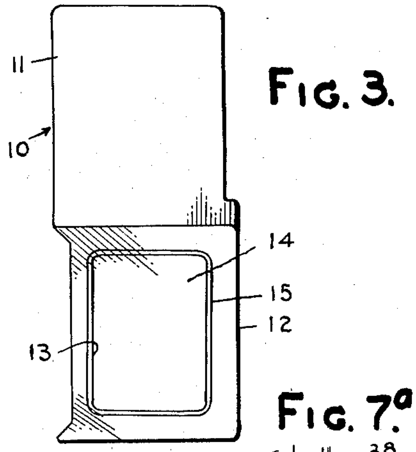
Figures 1, 4, 7A:
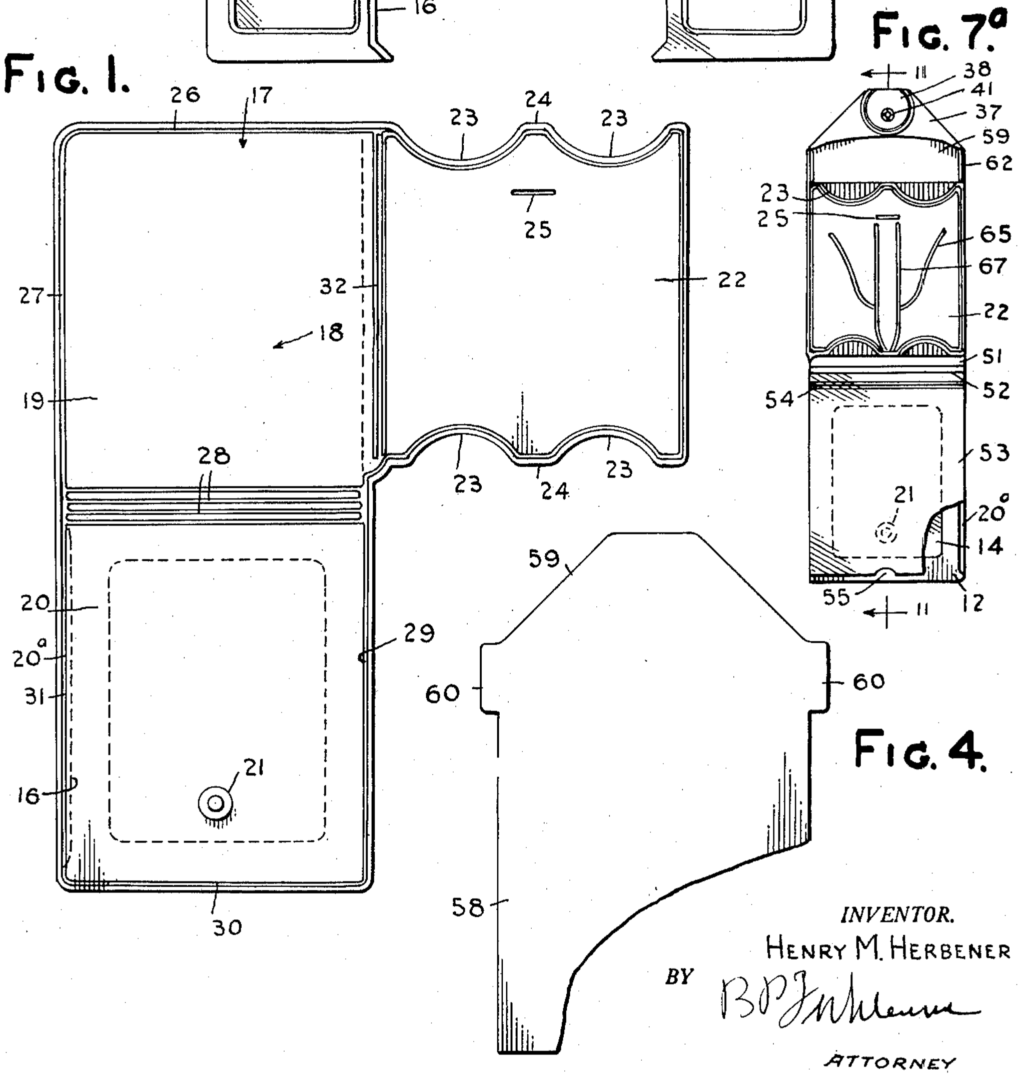
Figures 5, 6, 7, 8, 9, 10:
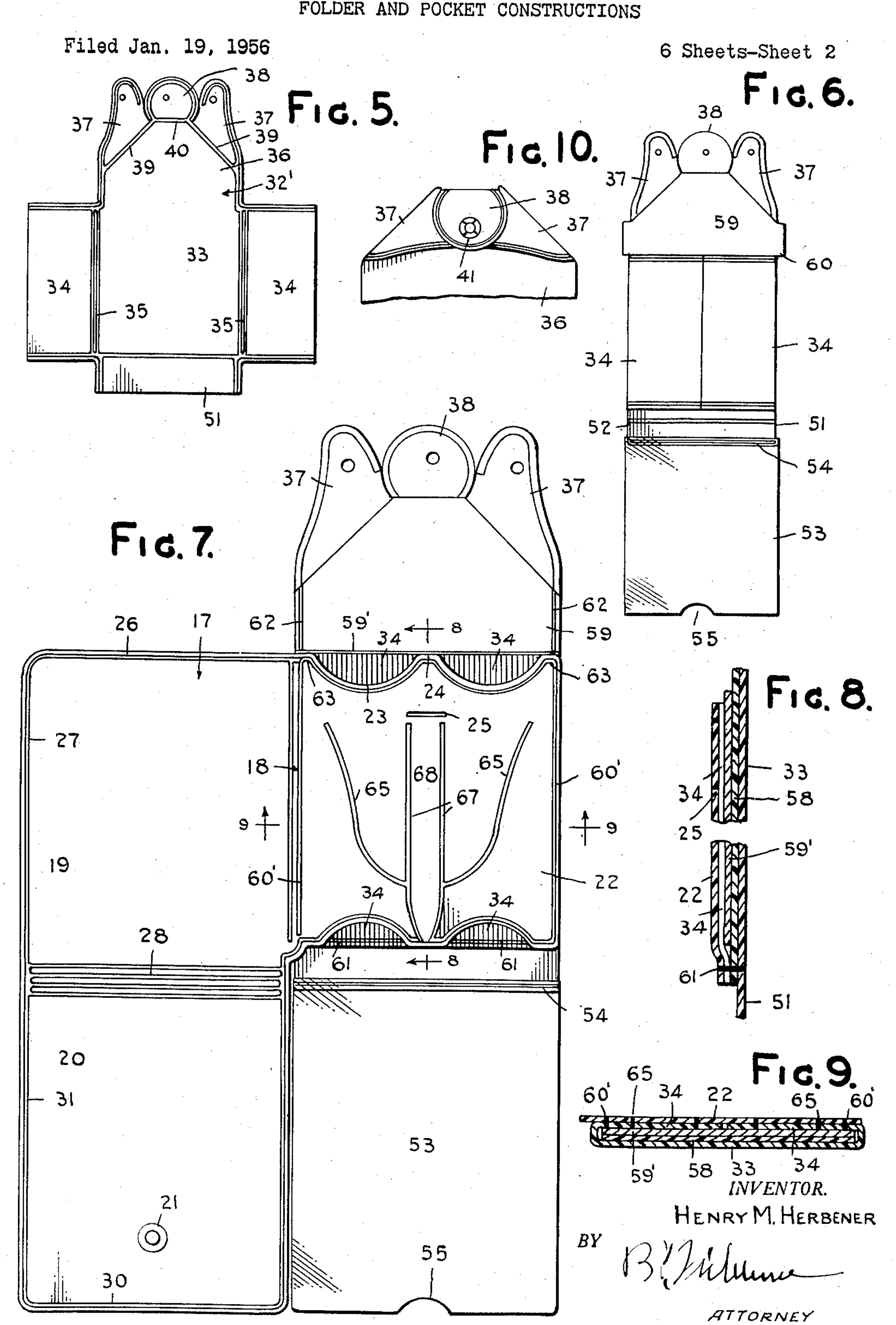

In the accompanying drawings forming a part of this application and in which like numerals are employed to designate like parts throughout same, Figure 1 is a plan view of the blank forming the body portion of the folder and a partition side, Figure 2 is a plan view of a blank forming a liner which is applied to the body portion, Figure 3 is a plan view of the opposite side of the liner, Figure 4 is a plan view of a blank forming a liner for the coin receiving cup, parts broken away, Figure 5 is a plan view of the blank which forms the coin receiving pocket and coin receiving cup.

Figures 11, 17, 18, 19, 20:
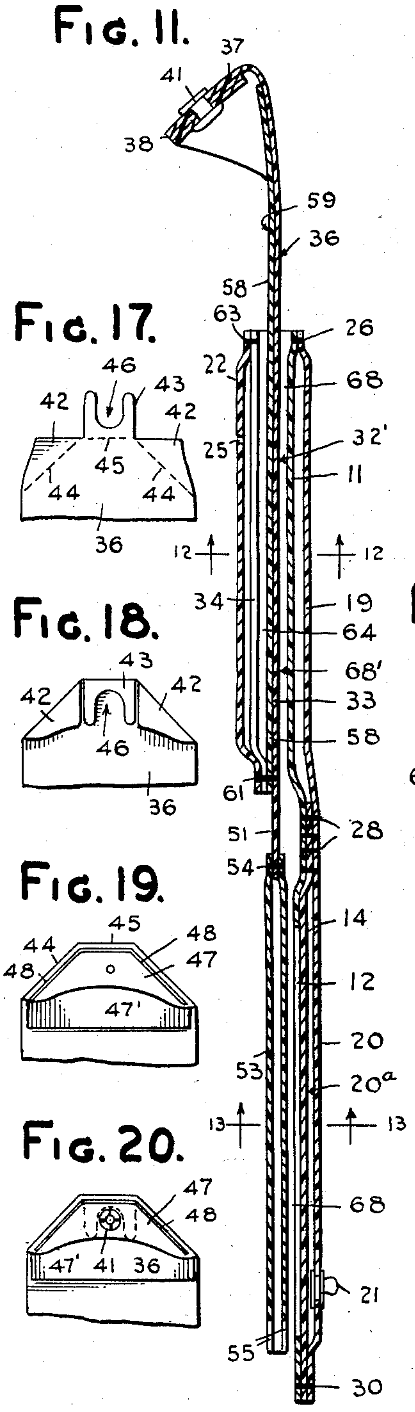
Figure 12:
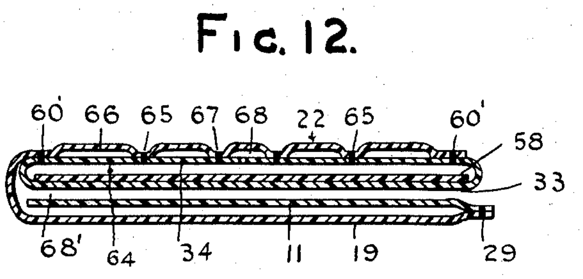
Figure 13:
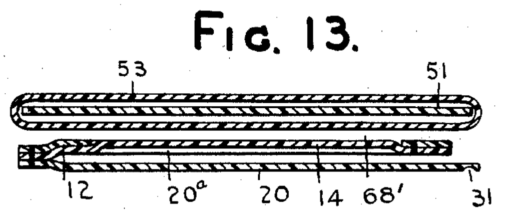
Figures 14, 15, 16:
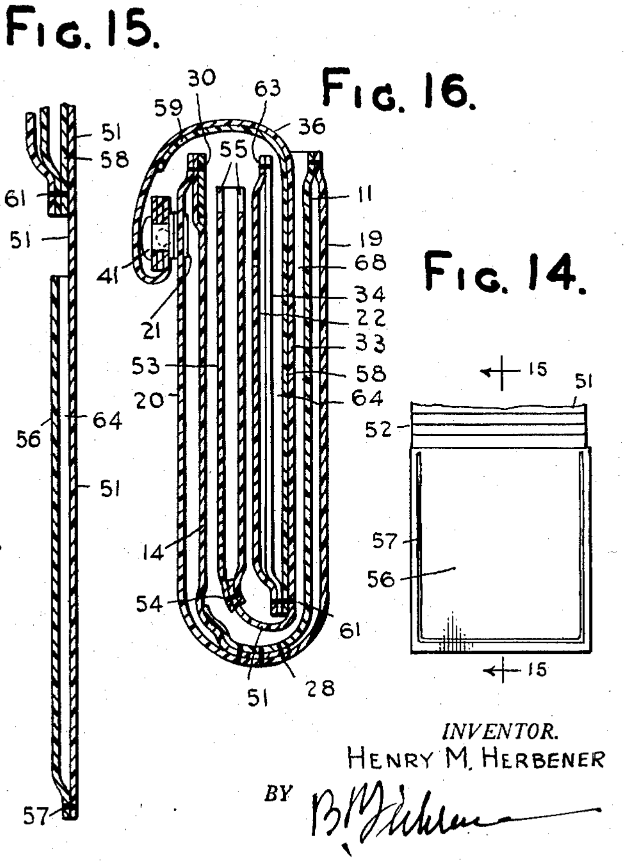
Figures 21, 22, 25A:
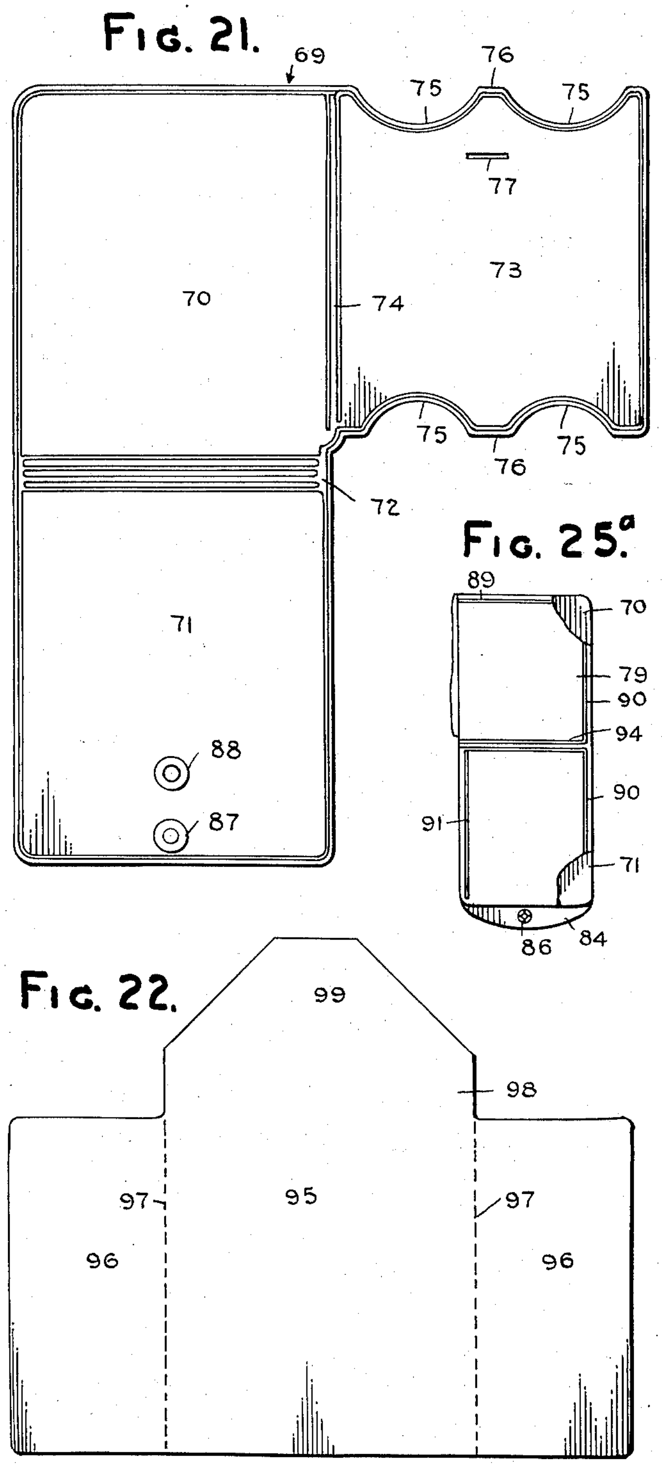
Figure 23:
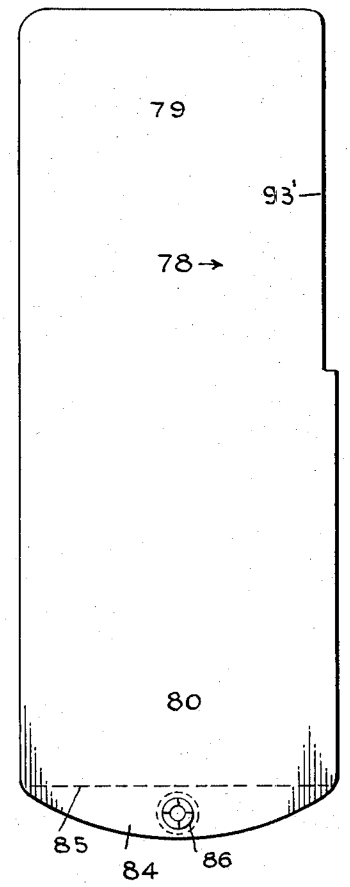
Figure 22A:
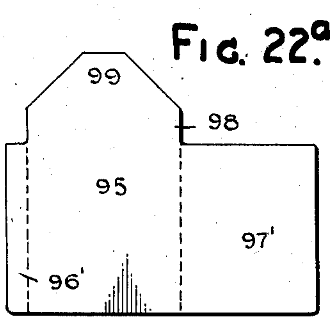
Figures 24, 24A, 25:
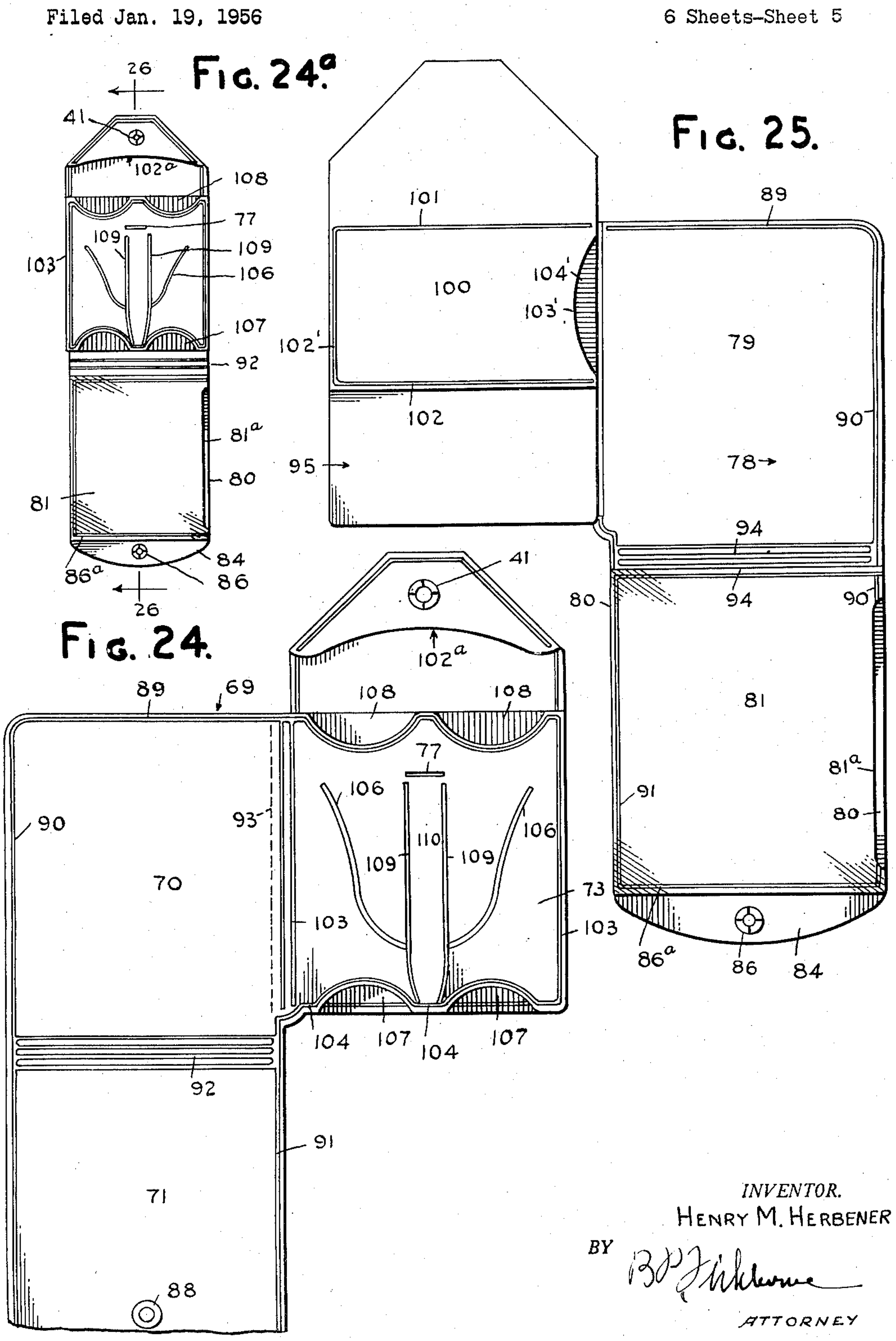
Figure 26:
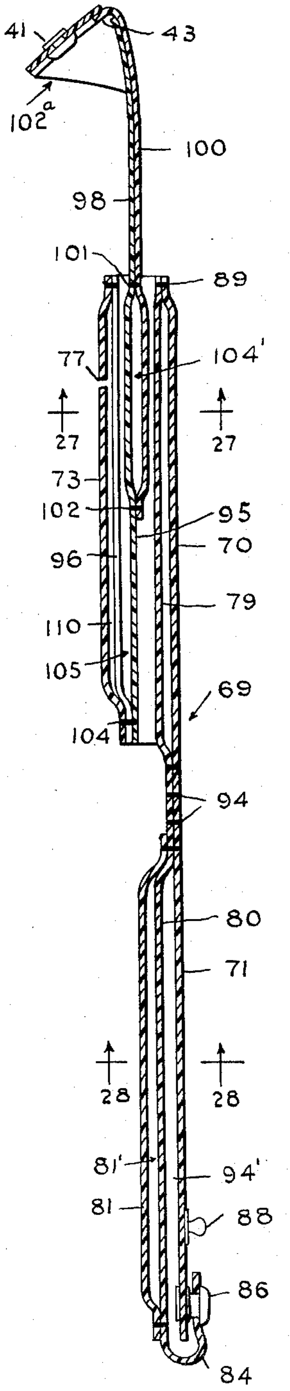
Figure 27:
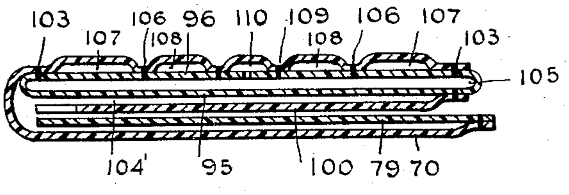
Figure 28:
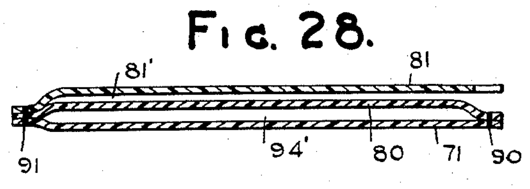
Figure 29:
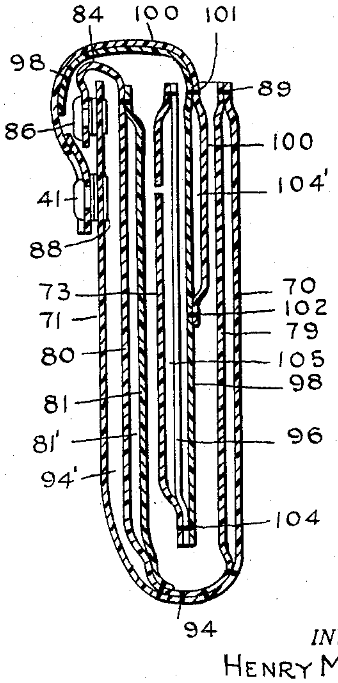

Figure 6 is a view similar to Figure 5, with the liner for the coin receiving cup in place and the extensions folded over the liner and a pocket carried by the end extension, Figure 7 is a plan view of the body portion blank showing the partition blank carried thereby arranged over the sides which form the coin receiving pocket, Figure 7*a* is a plan view of the completed folder, in the open position, with the partition arranged over the adjacent body portion side, Figure 8 is a longitudinal section taken on line 8—8 of Figure 7, Figure 9 is a transverse section taken on line 9—9 of Figure 7, Figure 10 is a plan view of the assembled coin receiving cup, Figure 11 is a longitudinal section taken on line 11—11 of Figure 7*a*, Figure 12 is a transverse section taken on line 12—12 of Figure 11, Figure 13 is a transverse section taken on line 13—13 of Figure 11, Figure 14 is a plan view of a modified form of pocket carried by the partition and extension, Figure 15 is a longitudinal section taken on line 15—15 of Figure 14, Figure 16 is a central longitudinal section through the completely folded bill folder, the parts being somewhat separated for the purpose of illustration, Figure 17 is a plan view of a modified form of blank for forming a different coin receiving cup, parts broken away, Figure 18 is a similar view showing the flaps folded over, Figure 19 is a similar view showing a connecting flap arranged upon the folded over flaps, with a copper plate in position for sealing or welding, Figure 20 is a similar view showing the connecting flap secured to the folded over flaps and the socket of the snap fastener secured to the connecting flap, Figure 21 is an L-shaped blank forming the body portion sides and a partition side of a modified form of folder, Figure 22 is a plan view of a blank included in the partition and serving to form a coin receiving pocket, Figure 22*a* is a plan view of a modified form of blank for forming the coin receiving pocket, Figure 23 is a plan view of a liner element for the body portion of the folder, Figure 24 is a plan view of the assembled folder, all parts in the open position, Figure 24*a* is a plan view of the completed folder, the partition being in the inner position and the body portion sides in the open position, Figure 25 is a plan view of the folder in the open position, inverted with respect to Figure 24, Figure 25*a* is a view similar to Figure 25, with the transparent sheet 81 omitted, for the purpose of illustration, Figure 26 is a longitudinal section taken on line 26—26 of Figure 24*a*, Figure 27 is a transverse section taken on line 27—27 of Figure 26, Figure 28 is a similar view taken on line 28—28 of Figure 26, and, Figure 29 is a central vertical longitudinal section through the completely folded folder, parts being separated for the purpose of illustration.

The several blanks and associated elements from which the folder is made are formed of plastic material and are sealed or welded together, by the use of the apparatus shown in Patent 2,631,646, or other suitable apparatus.

The numeral 10 designates a blank, Figures 2 and 3, for forming a liner which is applied to the body portion of the folder. This body portion liner includes a side 11 and side 12. The side 12 has a large window opening 13. Arranged beneath the side 12, Figure 2, and above it, Figure 3, is a transparent sheet or side 14, which is electrically sealed or welded to the side 12 along the line 15, which follows the edge of the window opening 13, as shown. The transparent side 14 may extend outwardly beyond the line of welding 15 adjacent to the outer edge of the sheet 12 and the lower end of the sheet 11, Figure 3. The side 12 is also welded to the transparent side 14 along a line of sealing and welding 16 and the material outwardly of this line 16 may be removed by tearing or cutting. The liner 10 thus formed is a completed unit.

The folder, Figure 1, comprises an L-shaped blank 17 including a longitudinal portion 18 included in the body portion of the folder. This body portion includes sides 19 and 20, connected at their inner ends, and the side 20 has an opening formed therein for receiving the stud 21 of the snap fastener, which is thereby attached to the side 20. This stud 21 is secured to the side 20 before the body portion liner is applied to the body portion. The L-shaped blank includes a partition side 22 carried by the longitudinal edge of the body portion side 18, as shown. The partition side 22 is provided with scalloped ends 23, forming extensions 24. The partition side 22 may also have a slot 25 formed therein.

The assembled liner 10 is now arranged as shown in Figure 3 and is placed in a recess in a horizontal frame and is held properly centered within the recess. The L-shaped blank 17 is now introduced into this recess above the body portion liner 10 and is held properly centered therein. The body portion side 19 covers the liner side 11 and the side 20 covers the side 12. The side 19 is secured to the side 11 by an end welding or sealing line 26, a side welding line 27, transverse welding lines 28. A longitudinal welding line 29 and a transverse welding line 30 serve to secure side 20 to side 12. These various welding lines form an S-shaped continuous welding line. The welding line 27 is continued in the form of a line 31 which extends to the welding line 30, and produces a neat appearance, but the welding line 31 does not secure the side 12 to the side 20 as it is arranged outwardly of the line 16, Figure 2. These various welding lines may be formed at the same time by the use of the die shown in Patent 2,631,646, and at the same time, a longitudinal folding line 32 may also be formed. At the same time, the die may also form the lines or grooves following the edges 23 and could also form the slot 25. The side 20 forms with the side 12 and transparent side 14 a pocket 20*a*, open at the side along the longitudinal line 31.

The numeral 32′, Figure 5, designates a blank for forming a partition, coin receiving pocket, and coin receiving cup. This blank includes a partition side 33 having side extensions 34, and longitudinal folding lines 35. The side 33 has an extension 36, provided with flaps 37 and 38 having folding lines 39 and 40. These flaps are assembled in overlapping relation, Figure 10, to provide a coin receiving cup, and the flaps are secured together by the socket element 41 of the snap fastener and this socket element receives the stud 21. The coin receiving cup is similar to the coin receiving cup in my Patents 2,346,433 and 2,346,434 and operates in the same manner.

The coin receiving cup may be formed in a different manner and a modified form of coin receiving cup is shown in Figures 17 to 20 inclusive. I omit the flaps 37 and 38, Figure 5, and provide the extension 36 with flaps 42 and 43. The flaps 42 have folding lines 44 and the flap 43 has a folding line 45. The flaps 42 taper toward their opposite ends and the flap 43 has a recess 46. These flaps do not have the openings formed therein to receive the socket element 41 since they do not overlap. The flaps 42 and 43 are folded inwardly over the extension 36 but do not overlap. A separate connecting flap 47 is arranged upon the inwardly folded flaps 42 and 43 and are secured thereto by a welding line 48. To effect this welding, a copper plate 47′ is arranged between the folded over flaps 42 and 43 and the extension 36, and the die will weld the connecting flap to the flaps 42 and 43, along the line 48, without welding these parts to the extension 36. After this welding, the copper plate is removed. The socket 41 of the snap fastener is carried by the connecting flap 47 having an opening formed therein for this purpose, and the head of the socket 41 is arranged within the recess 46, thus rendering the construction considerably thinner as two overlapping layers are thus eliminated with the result that there will not be a tendency for the snap fastener to form a bulge in the extension 36 in use, when the folder is closed. All other parts of the folder remain identical with those shown and described in connection with the first form of the folder.

The side 33 is provided at its lower end, Figures 5, 6 and 11, with an extension 51, foldable upon a folding line 52. This extension serves to carry a preferably transparent pocket formed of plastic material. This pocket is designated by the numeral 53, Figures 6, 11 and 13, and may be tubular. The extension 51 is inserted into the upper end of the tubular pocket 53 and is secured thereto by a line of welding 54. The lower end of the pocket 53 is open and may have notches 55 formed therein for convenient removal of the articles. The welding along the line 54 may be effected at the same time that the folding lines 39 and 40 are formed.

I contemplate elongating the extension 51, Figures 14, 15, for forming a different type of pocket. I arrange a second sheet 56 upon the extension 51, Figures 14 and 15, and secure the sheet and extension together by a U-shaped line of welding 57, forming a pocket which is open at its inner end or top, Figure 15. The construction may be varied so that the pocket may be open at any side or end, if desired.

Arranged upon the partition side 33 is a liner 58 having an extension 59, Figures 4 and 11, and the extension carries projections 60. The extension 59 is tapered and corresponds to the shape of the extension 36 and its free end is arranged beneath the folded over flaps 37 and 38. The liner reinforces and stiffens the coin receiving pocket and the coin cup. The liner is important inasmuch as it stiffens the coin cup so that it will remain longitudinally extended when shifted to this position and the coins will pass from the coin receiving pocket to the coin cup. One side of the coin cup is therefore formed of two layers, which reinforces or stiffens such side, but the side may be longitudinally flexed so that the side comes transversely bowed. After the liner 58 has been applied to the partition side 33, the extensions 34 are folded over the side 33 and the inner edges of the extensions 34 substantially contact, Figure 6. The assembled elements 33, 58 and 34 are arranged in flat superposed relation and a copper plate 59′ is arranged between the elements 58 and 34, as shown in Figure 8. The assembled unit including the partition side 33, Figures 6 and 7, is now placed in a frame and is held properly centered therein, the pocket 53 being in the open flat position, Figure 11. The partition side 22 is now positioned over the folded extensions 34, and is properly centered with respect thereto. The partition side 22 is secured to the extensions 34 adjacent to the outer longitudinal edges of the side 33 but is not secured to the liner 58. This securing is effected by longitudinal welding lines 60′, the copper plate 59′ extending to the folded edges of the side 33 and thereby preventing this side being welded to the extensions 34. The side 22, extensions 34 and side 33 are secured together by transverse welding lines 61. The copper plate 59′ has its lower end Figure 8 spaced from the welding lines 61, and hence the welding lines 61 may connect the four layers, a further copper plate or electrode, not shown, being arranged behind the side 33, adjacent to the line of welding 61. It is preferred that the lines of welding pass through the liner 58 but the welding of the liner may be omitted, if desired. The projections 60 of the liner 58 are welded to the extension 36 by lines of welding 62. The upper end of the partition side 22 is welded to the extensions 34 by lines of welding 63 which do not connect with the liner 58, since the copper plate 59′ projects above the lines of welding 63. The extensions 34 form with the liner 58 and side 33 a coin receiving pocket 64, Figure 11, the lower end of which is closed by the line of welding 61, while the upper end of the pocket is open, since the lines of welding 63 terminate at the extensions 34. The side 22 is further secured to the extensions 34 by lines of welding 65, which do not connect with the liner 58, and these lines of welding 65 form key receiving pockets 66, Figure 12, extending longitudinally of the partition and having their open ends at the opposite ends of the partition. The side 22 is also secured to the extensions 34 by longitudinal lines of welding 67, Figures 7 and 12, forming a central longitudinal file receiving pocket 68', having the slot 25 leading to the same. The lower end of the pocket 68, Figure 7, is therefore closed while its upper end is open through the opening 25.

The side 22, side 33 and pocket 53, when the pocket 53 is transversely folded over the side 22, form a partition, about which the bills are folded. The side 19 is now folded beneath this partition, Figure 12, and the sides 19 and 20 may be in the open position, Figures 7 and 11. The bills may be arranged upon the sides 19 and 20 beneath the partition and the pocket 53, in the space 68', Figure 11. The pocket 53 and bills and the side 20 may now be folded over the partition, which is now arranged between the side 20 and side 19. The extension 36 is now folded over the side 20 and the socket 41 secured to the stud 21. The folder is now held closed. The bills may be stripped from the partition by a lateral movement outwardly about the free longitudinal edge of the partition, and the free corner of the side 19 may be bent outwardly to aid in this stripping action. This mode of operation is disclosed in my Patents 2,277,104 and 2,346,433. When it is desired to remove the coins from the coin receiving pocket 64, the extension 36 and coin receiving cup are separated from the side 20, which may still remain in the closed position, and by exerting inward pressure upon the edges of the folder and partition, the extension 36 and coin receiving cup are longitudinally flexed and transversely bowed, and by tilting the folder toward the then open coin receiving cup, the coins will drop from the pocket 64 into the cup. Since the key and file receiving pockets extend longitudinally of the partition, the partition may be flexed upon the longitudinal welding lines, such as 67, which renders the transverse bowing of the partition and coin receiving pocket and coin receiving cup convenient. Access may be had to the pocket 20*a* when the bill folder is in the opened or closed condition. Access may be had to the interior of the pocket 53, when the coin receiving cup is in the opened position and when the side 20 is partly or wholly in the opened position. When the pocket shown in Figure 14 is used, the side 20 must be opened to provide access to the inner end of the pocket.

In Figures 21 to 29, I have shown a modified form of bill folder. This folder comprises an L-shaped body portion blank 69 including a body portion side 70 and a body portion side 71, foldable transversely upon each other about a connecting section 72. The body portion blank 70 carries at one longitudinal edge a partition side 73 foldable upon the folding lines 74. This partition side 73 has scallops 75 at its opposite ends forming extensions 76. The side 73 has a slot or opening 77.

I provide a liner 78 for the body portion sides 70 and 71 including integral liner sides 79 and 80. Arranged upon the liner side 80 is a plastic transparent sheet 81. The liner side 80 is provided with a flap or tongue 84, foldable upon a transverse line 85. This flap carries a socket element 86 of a snap fastener. The side 71 carries outer and inner studs 87 and 88 of snap fasteners.

The liner including the sides 79 and 80 is inverted with respect to Figure 23 and the body portion including the sides 70 and 71 are arranged upon the liner, the side 70 covering the side 79 and the side 71 covering the side 80. The side 70 is secured at its top, Figures 25 and 25*a*, to the side 79 by a line of welding 89, extending to a vertical line of welding 90, Figure 25*a*, which extends from the top of the side 70 to the bottom of the side 71 and connects side 70 with side 79 and side 71 with side 80. A vertical line of welding 91 extends from the bottom of the side 70 and terminates at the flap 84. The liner 78 is also secured to the blank 69 by horizontal lines of welding 94, also affording folding line or lines. The liner side 80 forms with the body portion side 71 a pocket 94', open at its outer or lower end, Figure 26. This open end is adapted to be covered by the flap 84. The edge 93' of the side 79 is not welded to the side 70. The transparent pocket side 81 is secured to the liner side 80 and side 71 by the longitudinal welding line 90 and the longitudinal welding line 91 and also by the transverse welding line or lines 94. The lower or outer end of the transparent side 81 is also secured to the side 80 by a horizontal line of welding 86*a*. which does not connect with the body portion side 71. The side 81 forms with the side 80 a pocket 81', open at its longitudinal edge 81*a*.

The numeral 95 designates a pocket side, having side extensions 96 foldable upon lines 97. The pocket side carries an end extension 98 having a tapered portion 99. The numeral 100, Figures 25 and 26, designates a reinforcing side, applied to the outer surface of the pocket side 95 and extending to a point near the longitudinal center of the pocket side 95. The reinforcing side 100 is secured to the pocket side 95 by horizontal lines of welding 101 and 102, and by a vertical line of welding 102'. The edge 103' of the reinforcing side 100 is cut back, as shown, and the reinforcing side 100 forms with the pocket side 95 a pocket 104', open at the edge 103'. The reinforcing side 100 having the extension 98 applied to its front face, Figure 26, carries a coin receiving cup 102*a*, which is identical with the coin receiving cup shown in Figures 17 to 20. This coin receiving cup carries the socket 41 of the snap fastener to engage with the stud 88.

When the reinforcing side 100 has been applied to the pocket side 95, the side extensions 96 are folded over the pocket side 95 and the partition side 73 is placed upon the folded over side extensions 96. The partition side is now secured to the side extensions 96 by longitudinal lines of welding 103 which do not engage the pocket side 95. The lower extensions 76 of the side 73 and the lower ends of the side extensions 96 are all secured to the pocket side 95 by a horizontal line or lines of welding 104. This line of welding closes the lower end of the coin receiving pocket 105 between the side 95 and the extensions 96. The upper end of the coin receiving pocket is open, as shown in Figure 26. The partition side 73 is also secured to the extensions 96 by longitudinal lines of welding 106, forming key receiving pockets 107 and 108. These key receiving pockets have their open ends at the opposite ends of the partition side 73 and extend longitudinally of the partition side. The partition side 73 is also secured to the extensions 96 by longitudinal welding lines 109 extending centrally of the side 73 and forming a file receiving pocket 110 in communication with the slot 77.

The lines of welding need not occur in the order stated but may be varied.

In Figure 22*a*, I have shown a modification of the pocket side 95. In Figure 22*a*, I provide a narrow extension 96' and a long extension 97' which are folded over the pocket side 95 so that their vertical edges contact.

The principal difference between the second form of the invention and the first form is that the pocket 94' is open at its outer end. A further difference is that the pocket 81', formed by the transparent side 81, is carried by liner side 80 and is open at its longitudinal edge 81*a*. A further difference is that the coin receiving pocket is reinforced by the side which carries the coin receiving cup and extends about one-half the length of the coin receiving pocket, thus reducing the thickness of the pocket near its bottom. In the use of the coin receiving pocket, the coins naturally gravitate to the bottom of such pocket and hence, by having the inner side of the pocket formed of a single layer, the thickness of the folder is reduced in use, and also increases the flexibility of the coin receiving pocket adjacent to its bottom.

The use of the second form of the invention is practically identical with the first form and no further description is thought to be necessary.

It is to be understood that the forms of my invention herewith shown and described are to be taken as preferred examples of the same and that various changes in the shape, size and arrangement of parts may be resorted to, without departing from the spirit of the invention or the scope of the subjoined claims.

Having thus described my invention, I claim:

1. A folder comprising a body portion including body portion sides, one side being foldable over the other side, a coin receiving pocket including opposed side portions, one side portion extending outwardly beyond the other side portion, a reinforcing side secured to the elongated side portion and provided with means cooperating therewith to form a coin receiving cup, the end of said elongated side projecting into said cup, and foldable means connecting said coin receiving cup with one body portion side.

2. A folder comprising a flexible body portion including body portion sides, one body portion side being transversely foldable over the other body portion side, a coin receiving pocket including opposed side portions, one side portion being elongated and extending longitudinally beyond the other side portion and having means cooperating therewith to form a coin receiving cup carried by the end of the elongated side portion, the outer end of said elongated side portion including a plurality of layers of flexible sheet material, and a partition side secured to one body portion side and foldable longitudinally over the same, said partition side being attached to said coin receiving pocket.

3. A folder comprising a body portion including body portion sides, one side being foldable over the other side, a liner for the body portion including liner sides, one liner side being arranged over one body portion side and the other liner side being arranged over the other body portion side, means to secure the liner sides to the corresponding body portion sides, the securing means being arranged near the marginal edges of said sides, one liner side forming with the adjacent body portion side a pocket having an opening, a partition carried by the body portion side which does not have the pocket, said partition including means cooperating therewith to form thereon a coin receiving pocket, said partition including means cooperating therewith to form thereon a coin receiving cup arranged opposite to said pocket of the partition, and means to secure said cup to the body portion side carrying the pocket.

4. A folder comprising a body portion including body portion sides, one side being foldable transversely over the other side, means forming a pocket upon the inner face of one body portion side, said pocket being closed at its inner end adjacent to the line of folding of the body portion sides, a partition carried by the body portion side which is not provided with the pocket and foldable longitudinally over such body portion side, means forming a coin receiving pocket upon said partition, means forming a coin receiving cup upon said partition and arranged adjacent to the open end of the coin receiving pocket, the coin receiving cup being foldable transversely over said partition and the folded body portion side provided with said pocket, means detachably connecting the coin cup with the body portion side provided with the pocket, and means cooperating with said partition to form therewith a pocket secured to the inner end of said partition, said last-named pocket being foldable transversely over said partition to be arranged between said partition and the folded body portion side provided with the pocket first-named.

5. A folder comprising a body portion including body portion sides, one side being foldable transversely over the other side, means forming a pocket upon the inner face of one body portion side, a partition carried by the body portion side which is not provided with the pocket and foldable longitudinally over such body portion side, said partition including means cooperating therewith to form thereon a coin receiving pocket having its outer end open, means forming a coin receiving cup upon the outer end of said partition adjacent to said coin receiving pocket, said coin receiving cup being foldable over the folded body portion side having the pocket, means detachably securing the coin receiving cup to the body portion side having the pocket, means carried by said partition and cooperating therewith to form a pocket secured to the inner end of said partition and foldable transversely over such inner end to be arranged between the partition and the body portion side having said first-named pocket, said pocket which is secured to said partition having its end remote from said partition formed open.

6. A folder comprising a plastic L-shaped blank, said blank including body portion sides arranged in alignment and a partition side secured to the side edge of one body portion side, a liner arranged upon the inner face of the body portion sides, said liner being secured to the body portion sides by an S-shaped line of welding extending about one end and one side edge of one body portion side and then extending between said body portion sides and then longitudinally of the side edge of the other body portion side which is remote from the first side edge and then along the end of the other body portion side, said liner forming with the adjacent body portion side a pocket upon the inner face of such body portion side, said pocket being open at one longitudinal edge, and a plastic partition welded to said partition side at the longitudinal and transverse edges of said partition side, said partition including means cooperating therewith to form thereon a coin receiving pocket.

7. A folder comprising an L-shaped plastic blank, said blank including body portion sides arranged in alignment and foldable transversely over each other and a partition side carried by one body portion side at its longitudinal edge and foldable about such edge over the adjacent body portion side, a plastic liner blank including liner sides, one liner side being arranged over one body portion side and the other liner side over the other body portion side, one liner side being secured to the adjacent body portion side by a line of welding extending about the outer end of such liner side and about its longitudinal edge remote from the partition side, the other liner side being secured to the adjacent body portion side by a line of welding arranged adjacent to the longitudinal edge of such liner side and terminating at the outer end of such liner side, the second liner side being secured to the adjacent body portion side by a line of welding which follows the longitudinal edge of the second liner side which edge is next to said partition side, the last-named longitudinal line of welding terminating at the outer end of the second-named liner side, the second-named liner side forming with the adjacent body portion side a pocket having its outer end open, and means carried by said partition side for forming a coin receiving pocket.

8. A folder comprising an L-shaped plastic blank, said blank including body portion sides arranged in alignment and foldable transversely over each other and a partition side carried by one body portion side at its longitudinal edge and foldable about such edge over the adjacent body portion side, a plastic liner blank including first and second liner sides, the first liner side being arranged over one body portion side and the second liner side over the other body portion side, the first liner side being secured to the adjacent body portion side by a line of welding extending about the outer end of the first liner side and about the longitudinal edge of the first liner side remote from said partition side, the second liner side being secured to the adjacent body portion side at the side edge thereof next to the partition side by a line of welding terminating at the outer end of said second liner side, the second liner side forming with the adjacent body portion side a pocket having its outer end open, a flap carried by the outer end of the second liner side and foldable over the outer end of the adjacent body portion side, a snap fastener connecting said flap and last-named body portion side, a plastic element arranged upon the inner side of the partition side and forming therewith a coin receiving pocket, longitudinal lines of welding connecting the partition side and plastic element, said plastic element including means forming a coin receiving cup arranged adjacent to the outer end of the coin receiving pocket, said coin receiving cup being foldable over the end of the body portion side provided with the pocket, and a snap fastener for connecting the coin receiving cup and the body portion side provided with said pocket.

9. A folder comprising a body portion including body portion sides which are transversely foldable over each other, a partition side carried by the longitudinal edge of one body portion side and foldable over the same, a third side disposed upon one side of the partition side and forming a coin receiving pocket therewith, said third side including an end extension projecting beyond said partition side, a reinforcing side mounted upon the face of the third side and said extension and secured thereto and terminating near the longitudinal center of the third side, the reinforcing side carrying flaps forming a pocket receiving cup, the extension of the third side projecting into said cup.

10. A folder comprising a body portion including body portion sides which are transversely foldable over each other, a partition secured to the longitudinal edge of one body portion side and adapted to be arranged between said sides, said partition including means cooperating therewith to form thereon a coin receiving pocket, said pocket including a pocket side projecting beyond the open end of said pocket, said pocket side including a pair of outer flaps and an intermediate flap, all of said flaps being folded inwardly over said pocket side, the intermediate flap having a recess formed therein, a connecting flap extending over the intermediate and outer flaps and said recess, a snap fastener element secured to the connecting flap and having a part thereof arranged within said recess, and a coacting snap fastener element carried by the body portion side which does not carry the partition side for detachable engagement with the first-named snap fastener element.

11. A coin receiving pocket including first and second sides and having an open end, the second side extending outwardly beyond the open end of said pocket, said second side including a pair of outer flaps and an intermediate flap, said flaps being foldable inwardly over the second side without overlapping, the intermediate flap having a recess formed therein, a connecting flap extending over the intermediate and outer flaps and said recess and connected with said intermediate and outer flaps, a snap fastener element secured to the connecting flap and being arranged in alignment with said recess, and a coacting snap fastener element connected with said pocket near its end remote from said flaps for engagement with the first-named snap fastener element.

12. A coin receiving pocket comprising a first and second side and having an open end and a closed end, the second side including an extension projecting beyond the open end of the pocket, a reinforcing side arranged upon that face of the second side remote from the pocket and secured to such face and terminating short of the closed end of the pocket, the reinforcing side including flaps foldable over the reinforcing side for forming therewith a coin receiving cup, and means connecting the folded flaps, the extension of the second side projecting into the coin receiving cup.

13. A folder comprising a body portion including body portion sides which are transversely foldable over each other, a partition secured to one body portion side and adapted to be folded to a position between said sides, said partition including first and second opposed sides forming a coin receiving pocket, the first side extending outwardly longitudinally beyond said second side, a reinforcing side arranged upon the outer face of the first side with respect to said coin receiving pocket and extending longitudinally of said first side and terminating near the longitudinal center of the first side and extending to the outer end of the extension of the first side, spaced means extending transversely of the first side and reinforcing side and connecting the same near the inner end of the reinforcing side and near the outer end of said partition and forming with the first side and reinforcing side a pocket having one end open, and a coin receiving cup carried by the free end of the reinforcing side and being a part thereof and extending upon the opposite side of the extension of said first side.

14. A folder comprising a body portion including body portion sides which are transversely foldable over each other, a partition secured to one body portion side and adapted to be folded to a position between said sides, said partition including means cooperating therewith to form thereon a coin receiving pocket and a coin receiving cup which coin receiving cup is foldable over said partition, a lining arranged upon the inner face of said body portion and secured thereto and including lining sides arranged opposite the body portion sides, the lining side arranged opposite the body portion side which is remote from said partition forming with said body portion side a pocket which is open at its outer end, an extension carried by the last-named lining side adjacent to the open end of said pocket, means detachably connecting said extension and the body portion side of the last-named pocket, and means detachably connecting the coin cup and the body portion side of said last-named pocket, and a transparent sheet arranged upon the inner face of the lining face of the pocket having its outer end open and secured to said lining face and forming therewith a pocket open at one longitudinal edge.

15. A folder comprising a body portion including body portion sides which are transversely folded over each other, a partition secured to one body portion side and adapted to be folded to a position between said sides, said partition having means cooperating therewith to form thereon a coin receiving pocket, said pocket including a pocket side projecting beyond one end of the pocket, said one end of the pocket being open, a pair of outer flaps and an intermediate flap carried by the pocket side, said flaps being folded inwardly over the pocket side without overlapping of the flaps, the intermediate flap having a recess formed therein, a connecting flap extending over the intermediate and outer flaps and said recess and secured to said flaps, the outer, intermediate and connecting flaps forming with said pocket side a coin receiving cup, a snap fastener element secured to the connecting flap and arranged in alignment with said recess, and a coacting snap fastener element carried by the body portion side which does not carry the partition for detachable engagement with the first-named snap fastener element.

References Cited in the file of this patent

UNITED STATES PATENTS

| | | |
|---|---|---|
| 1,220,793 | Spector | Mar. 27, 1917 |
| 1,524,757 | Sonin | Feb. 3, 1925 |
| 1,610,146 | Panzer | Dec. 7, 1926 |
| 1,944,345 | Hughes | Jan. 23, 1934 |
| 1,978,257 | Gardiner | Oct. 23, 1934 |
| 2,185,359 | Swanson | Jan. 2, 1940 |
| 2,341,327 | Lyndes et al. | Feb. 8, 1944 |
| 2,358,008 | Herbener | Sept. 12, 1944 |
| 2,399,898 | Stember | May 7, 1946 |
| 2,435,032 | Campbell | Jan. 27, 1948 |
| 2,623,566 | Kibler | Dec. 30, 1952 |
| 2,683,479 | Ikeda | July 13, 1954 |
| 2,788,821 | Marelle | Apr. 16, 1957 |